June 12, 1945. J. L. FULLER 2,377,930
TAPPED STATOR WINDING
Filed Aug. 28, 1942

INVENTOR.
JOHN L. FULLER
BY
Hoodling and Kroet
attys.

Patented June 12, 1945

2,377,930

UNITED STATES PATENT OFFICE 2,377,930

TAPPED STATOR WINDING

John L. Fuller, Cleveland, Ohio, assignor to The Reliance Electric & Engineering Company, a corporation of Ohio Application August 28, 1942, Serial No. 456,481

8 Claims. (Cl. 171—123)

My invention relates in general to an alternating current motor and more particularly to a stator having tapped connections arranged to supply current at any desired voltage to an electrical load.

As illustrated in the accompanying drawing, the electrical load may be the direct current field of a generator driven by the rotor of the alternating current motor having the stator with the tapped connections. The electrical load may also include the direct current field of a direct current motor connected in looped armature circuit with the generator, or any other electrical device or circuit. The alternating current supplied by the tapped connections on the stator may be rectified by any suitable means, whereby direct current is supplied to the fields or to other electrical loads. Inasmuch as the direct current voltage across the field, in actual practice, is ordinarily less than the voltage of the alternating current supply, it has been necessary to use the combination of a step-down transformer and a rectifier to supply the reduced direct current voltage to the fields. In my invention, I use the stator windings as a step-down transformer to supply the reduced voltage.

An object of my invention is to eliminate the necessity of a step-down transformer to supply the reduced voltage.

Another object of my invention is to eliminate the necessity of a transformer to supply alternating current power to a rectifier, when used in equipment containing an alternating current motor.

Another object of my invention is the provision of a stator having tapped connections which enable the current tapped off to be taken equally from opposite sides of the stator to substantially balance out any side pull on the rotor to avoid any possible vibration difficulty.

Another object of my invention is to connect physically opposite windings in series as a winding portion to substantially balance out any side pull on the rotor.

Other objects and a fuller understanding of my invention may be had by referring to the following description and claims, taken in conjunction with the accompanying drawing, in which:

Figure 1:
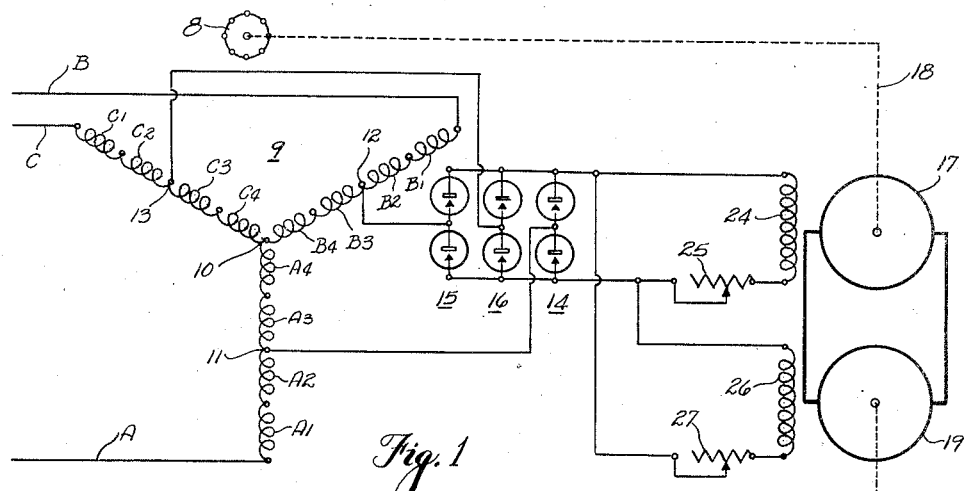
Figure 1 is a diagrammatic illustration of a circuit arrangement including an alternating current motor having a stator embodying the features of my invention.

With reference to the drawing, I have illustrated my invention in connection with a three-phase two-pole alternating current motor, although it is to be understood that the motor may have any other arrangement of phase and pole construction. As shown, the alternating current motor comprises a rotor 8, and a stator 9 having a neutral connection 10 and tapped connections 11, 12 and 13 for supplying a current of a reduced voltage to the three phase bridge connected rectifiers 14, 15 and 16 which, in turn, deliver direct current to the field 24 of the generator 17 and the field 26 of the direct current motor 19. The generator 17 may be mechanically driven by the rotor 8 by any suitable means as indicated by the dotted line 18. The armature of the direct current motor 19 is connected in a closed looped circuit relation with the armature of the generator 17 and is arranged to drive a load 20. The speed of the direct current motor 19 may be varied by varying the excitation of the fields 24 and 26 by means of the adjustable resistors 25 and 27, respectively.

The stator 9 is arranged to be energized by a three-phase supply source comprising the three conductors indicated by the reference characters A, B and C. Each winding between the respective three conductors A, B and C and the neutral connection 10 constitutes a phase winding. While I have shown a Y-connected stator, it is to be understood that my invention may be applied to a delta-connected stator. As shown in Figure 1, the phase winding connected to the supply conductor A may be designated as the A-phase winding and comprises the windings $A_1$, $A_2$, $A_3$ and $A_4$. Similarly, the phase windings connected to the supply conductors B and C may be respectively referred to as the B-phase winding and the C-phase winding. The B-phase winding comprises the windings $B_1$, $B_2$, $B_3$ and $B_4$ and the C-phase winding comprises the windings $C_1$, $C_2$, $C_3$ and $C_4$.

Each of the phase windings includes at least two series winding portions having the tapped connection therebetween. Thus, the windings $A_1$ and $A_2$ and the windings $A_3$ and $A_4$ constitute two series winding portions having the tapped connection 11 therebetween. Similarly, the windings $B_1$ and $B_2$ and the windings $B_3$ and $B_4$ comprise two series winding portions with the tapped connection 12 therebetween, and the windings $C_1$ and $C_2$ and the windings $C_3$ and $C_4$ comprise two series winding portions with the tapped connection 13 therebetween.

Figure 3:
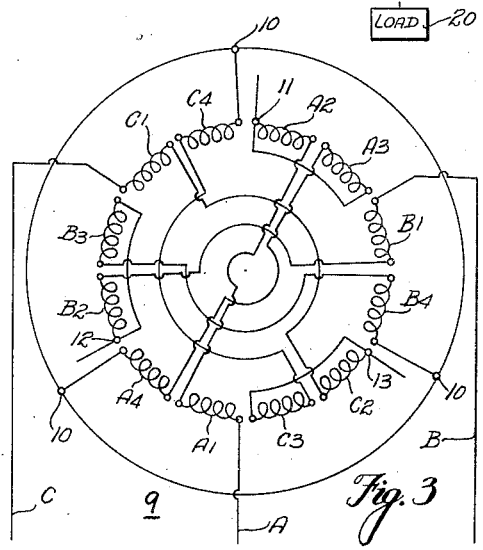
Figure 3 is a diagrammatic illustration of a stator winding for an alternating current motor embodying the features of my invention, wherein the pole phase groups are substantially equally divided into two portions.

When current is being drawn from the tapped connections for supplying energy to the rectifiers, the outer series of winding portions $A_1$ and $A_2$, $B_1$ and $B_2$, and $C_1$ and $C_2$ carry more current than the inner series of winding portions $A_3$ and $A_4$, $B_3$ and $B_4$, and $C_3$ and $C_4$. Therefore, to avoid any side pull on the rotor resulting from more current flowing in the outer series of winding portions than in the inner series of winding portions, I provide for connecting physically opposite windings in series as a winding portion. This arrangement is illustrated in Figure 3, wherein the windings $A_1$ and $A_4$ and the windings $A_2$ and $A_3$ constitute physically opposite pole phase groups; the windings $B_1$ and $B_4$ and the windings $B_2$ and $B_3$ constitute a second pair of physically opposite pole phase groups, and the windings $C_1$ and $C_4$ and the windings $C_2$ and $C_3$ comprise a third pair of physically opposite pole phase groups. In my invention, the windings $A_1$ and $A_2$ have substantially the same number of turns. The windings $A_3$ and $A_4$ also have substantially the same number of turns. Consequently, current flowing through the outer series of winding portions $A_1$ and $A_2$ and the inner series of winding portions $A_3$ and $A_4$, even though the current flowing through the outer series of winding portions is greater than the current flowing through the inner series of winding portions, will produce substantially the same amount of flux in the physically opposite pole phase groups which will balance any side pull on the rotor to avoid any possible vibration difficulty. The same balanced condition of flux applies equally well to the phase windings B and C.

Figure 2:
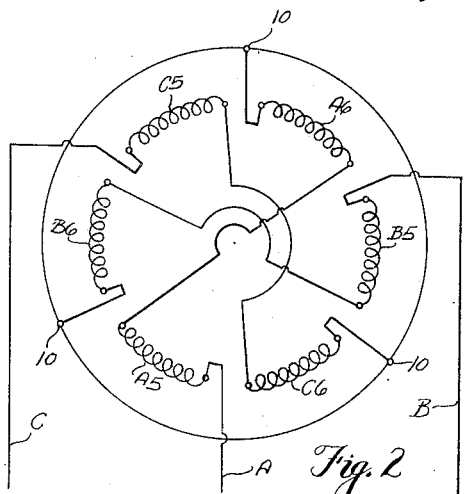
Figure 2 is a diagrammatic illustration of a stator winding for an alternating current motor, wherein the pole phase groups are not divided.

So far as the flux condition of the stator is concerned, the combination of the split pole phase windings $A_1$ and $A_4$ of Figure 3 is comparable to the single pole phase winding $A_5$ of Figure 2 which represents a stator of the ordinary construction. Correspondingly, the combination of the split pole phase windings $A_2$ and $A_3$ is comparable to the single pole phase winding $A_6$. The same comparison may be applied to the combination of the split pole phase windings $B_1$ and $B_4$, and $B_2$ and $B_3$ which are equivalent, respectively, to the single pole phase windings $B_5$ and $B_6$, and to the combination of the split pole phase windings $C_1$ and $C_4$, and $C_2$ and $C_3$ which are equivalent, respectively, to the pole phase windings $C_5$ and $C_6$. The balanced condition of the flux in physically opposite sides of the stator to prevent side pull on the rotor does not prevail where the pole phase windings are not divided as shown in Figure 2. In my stator construction the dividing of the pole phase windings and the connecting of the divided portions as shown in Figure 3 enables me to cause the current drawn off the tapped connections to be taken equally from opposite sides of the stator to avoid possible vibration difficulty.

Figure 4:
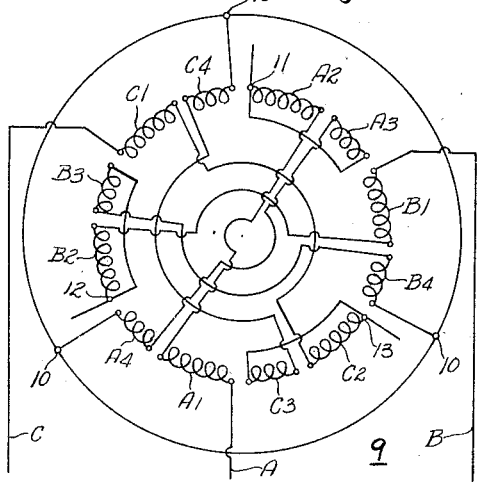
Figure 4 is an illustration similar to Figure 3, but shows the pole phase groups divided into unequal portions.

As shown in Figure 3, the split pole phase windings $A_1$ and $A_4$; $A_2$ and $A_3$; $B_1$ and $B_4$; $B_2$ and $B_3$; $C_1$ and $C_4$, and $C_2$ and $C_3$ have substantially the same number of turns. With this arrangement the reduced voltage impressed upon the rectifiers is substantially one-half of the supply voltage. Thus, substantially 220 volts would be impressed upon the rectifiers with a supply voltage of 440 volts. Under those conditions where the supply voltage is in the neighborhood of 550 volts or higher, and it is still desired to keep 220 volts on the rectifiers, then it is necessary to change the turn ratio of the split pole phase windings as shown in Figure 4. In this embodiment, the ratio of turns between $A_1$ and $A_4$; $A_2$ and $A_3$; $B_1$ and $B_4$; $B_2$ and $B_3$; $C_1$ and $C_4$, and $C_2$ and $C_3$ is such as to supply the desired voltage on the rectifiers with a higher supply line voltage. My invention is not limited to the two showings of Figures 3 and 4 but contemplates any arrangement of the ratio of turns to give the desired voltage for any supply line voltage.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. In an alternating current motor having a stator, the improvement of a stator winding comprising a plurality of windings, said windings forming at least two substantially similar groups arranged physically opposite each other with each physical group constituting a pole phase group, each group comprising at least a first winding and a second winding, said windings being connected in series and forming at least two series winding portions, a tapped connection between said two series winding portions, one of said series winding portions comprising the said first winding of both said pole phase groups connected in series sequence, whereby current flowing in said first windings will establish flux in both of said physically opposite pole phase groups, and the other of said series winding portions comprising the said second windings of both said pole phase groups connected in series sequence, whereby current flowing in said second windings will also establish flux in both of said physically opposite pole phase groups.

2. In an alternating current motor having a stator and a rotor, the improvement of a stator winding comprising a plurality of windings, said windings forming at least two substantially similar groups arranged physically opposite each other with each physical group constituting a pole phase group, each group comprising at least a first winding and a second winding, said windings being connected in series and forming at least two series winding portions, a tapped connection between said two series winding portions, one of said series winding portions comprising the said first winding of both said pole phase groups connected in series sequence, whereby current flowing in said first windings will establish flux in both of said physically opposite pole phase groups, and the other of said series winding portions comprising the said second windings of both said pole phase groups connected in series sequence, whereby current flowing in said second windings will also establish flux in both of said physically opposite pole phase groups, said first windings being substantially alike and said second windings being substantially alike to produce substantially the same amount of flux in said physically opposite pole phase groups for balancing out any side pull on the rotor.

3. In an alternating current motor having a stator and a rotor, the improvement of a stator winding comprising a plurality of windings, said windings forming at least two substantially similar groups arranged physically opposite each other with each physical group constituting a pole phase group, each group comprising at least a first winding and a second winding, said windings being connected in series and forming at least two series winding portions, a tapped connection between said two series winding portions, one of said series winding portions comprising the said first winding of both said pole phase groups connected in series sequence, whereby current flowing in said first windings will establish flux in both of said physically opposite pole phase groups, and the other of said series winding portions comprising the said second windings of both said pole phase groups connected in series sequence, whereby current flowing in said second windings will also establish flux in both of said physically opposite pole phase groups, said first windings being substantially alike and said second windings being substantially alike to produce substantially the same amount of flux in said physically opposite pole phase groups for balancing out any side pull on the rotor, said first windings and said second windings being also substantially alike.

4. In an alternating current motor having a stator and a rotor, the improvement of a stator winding comprising a plurality of windings, said windings forming at least two substantially similar groups arranged physically opposite each other with each physical group constituting a pole phase group, each group comprising at least a first winding and a second winding, said windings being connected in series and forming at least two series winding portions, a tapped connection between said two series winding portions, one of said series winding portions comprising the said first winding of both said pole phase groups connected in series sequence, whereby current flowing in said first windings will establish flux in both of said physically opposite pole phase groups, and the other of said series winding portions comprising the said second windings of both said pole phase groups connected in series sequence, whereby current flowing in said second windings will also establish flux in both of said physically opposite pole phase groups, said first windings being substantially alike and said second windings being substantially alike to produce substantially the same amount of flux in said physically opposite pole phase groups for balancing out any side pull on the rotor, said first windings being different from the second windings.

5. In a polyphase alternating current motor, the improvement of a stator having a plurality of phase windings, each phase winding forming at least two substantially similar groups arranged physically opposite each other with each physical group constituting a pole phase group, each group comprising at least a first element and a second element, said elements of each phase winding being connected in series and forming at least two series winding portions, a tapped connection between said two series winding portions of each phase winding, one of said series winding portions comprising the said first element of both said pole phase groups connected in series sequence, whereby current flowing in said first elements will establish flux in both of said physically opposite pole phase groups, and the other of said series winding portions comprising the said second elements of both said pole phase groups connected in series sequence, whereby current flowing in said second elements will also establish flux in both of said physically opposite pole phase groups.

6. In combination with a source of alternating current and an electrical load, the improvement in a stator winding of an alternating current motor for supplying current to the electrical load, said improvement comprising a stator having a plurality of phase windings, each phase winding forming at least two substantially similar groups arranged physically opposite each other with each physical group constituting a pole phase group, each group comprising at least a first element and a second element, said elements of each phase winding being connected in series and forming at least two series winding portions of each phase winding, a tapped connection between said two series winding portions of each phase winding for supplying current to the electrical load, one of said series winding portions comprising the said first element of both said pole phase groups connected in series sequence, whereby current flowing in said first elements will establish flux in both of said physically opposite pole phase groups, and the other of said series winding portions comprising the said second elements of both said pole phase groups connected in series sequence, whereby current flowing in said second elements will also establish flux in both of said physically opposite pole phase groups.

7. In combination with a source of alternating current and an electrical load, the improvement in a stator winding of an alternating current motor for supplying current to the electrical load, said improvement comprising a stator having a plurality of phase windings, each phase winding forming at least two substantially similar groups arranged physically opposite each other with each physical group constituting a pole phase group, each group comprising at least a first element and a second element, said elements of each phase winding being connected in series and forming at least two series winding portions of each phase winding, a tapped connection between said two series winding portions of each phase winding, one of said series winding portions comprising the said first element of both said pole phase groups connected in series sequence, whereby current flowing in said first elements will establish flux in both of said physically opposite pole phase groups, and the other of said series winding portions comprising the said second elements of both said pole phase groups connected in series sequence, whereby current flowing in said second elements will also establish flux in both of said physically opposite pole phase groups, and rectifier means between the tapped connections and the electrical load for supplying direct current to the electrical load.

8. In combination with a source of alternating current and an alternating current motor having a winding energized from said source, a direct current generator having a field, the improvement of energizing the said field, said improvement comprising a stator having a plurality of phase windings, each phase winding forming at least two substantially similar groups arranged physically opposite each other with each physical group constituting a pole phase group, each group comprising at least a first element and a second element, said elements of each phase winding being connected in series and forming at least two series winding portions of each phase winding, a tapped connection between said two series winding portions of each phase winding, one of said series winding portions comprising the said first element of both said pole phase groups connected in series sequence, whereby current flowing in said first elements will establish flux in both of said physically opposite pole phase groups, and the other of said series winding portions comprising the said second element of both said pole phase groups connected in series sequence, whereby current flowing in said second elements will also establish flux in both of said physically opposite pole phase groups, and rectifier means between the tapped connections and the said field of the direct current generator for supplying direct current to the said field.

JOHN L. FULLER.